July 14, 1925.
C. FOWLER
TUNNEL TRANSPORTATION SYSTEM
Filed March 3, 1923
1,545,890
2 Sheets-Sheet 1
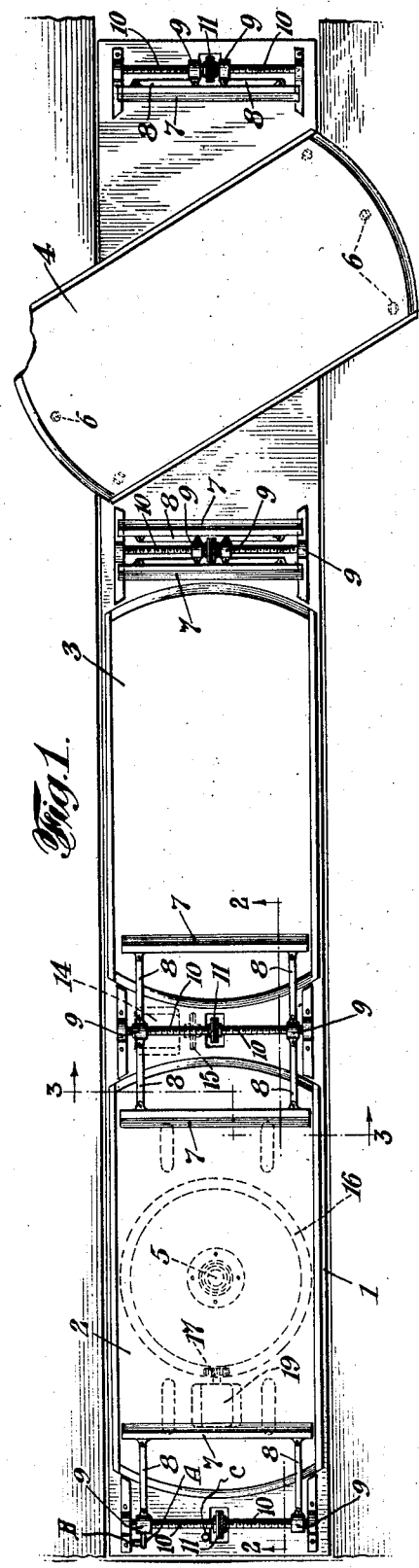
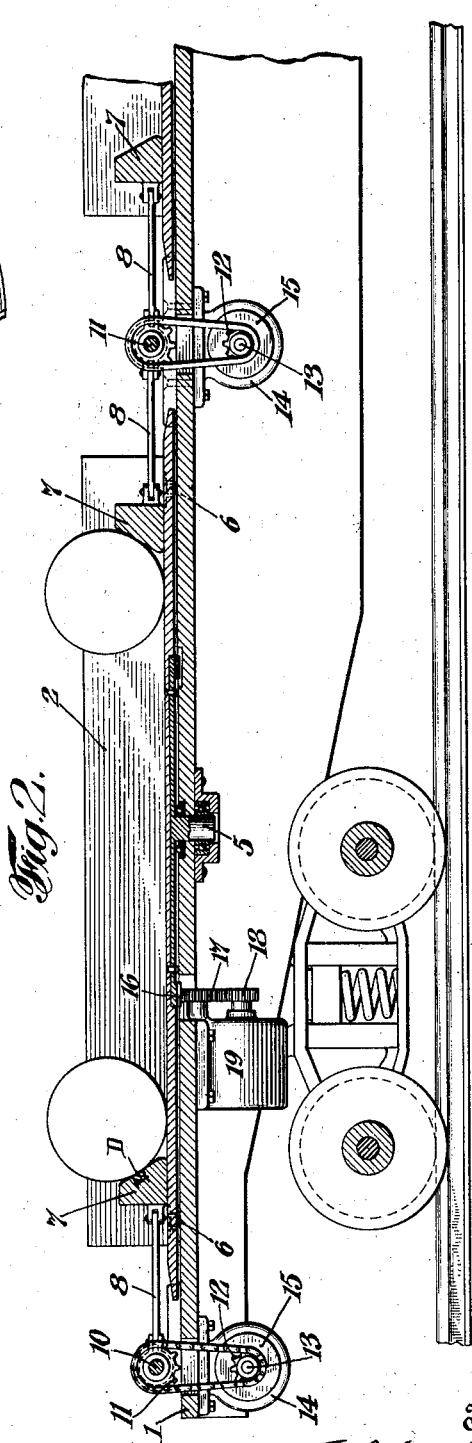
Inventor
Charles Fowler
By his Attorneys
Prindle, Wright, Neal and Bean July 14, 1925.
C. FOWLER
1,545,890
TUNNEL TRANSPORTATION SYSTEM
Filed March 3, 1923
2 Sheets-Sheet 2
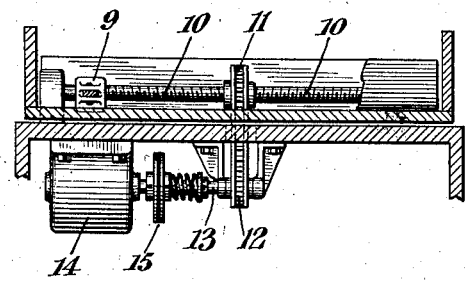
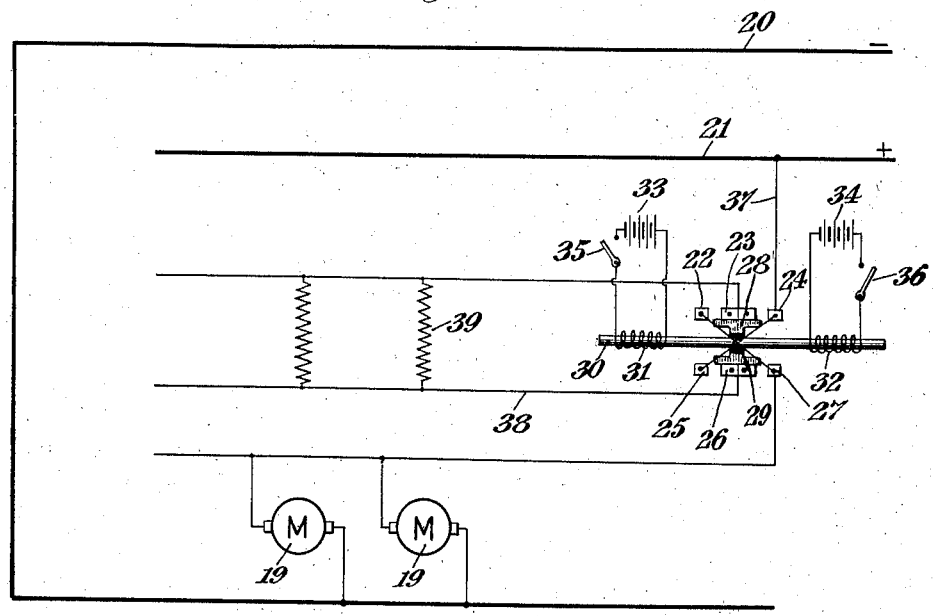

Patented July 14, 1925.

1,545,890

UNITED STATES PATENT OFFICE.

CHARLES FOWLER, OF NEW YORK, N. Y.

TUNNEL TRANSPORTATION SYSTEM.

Application filed March 3, 1923. Serial No. 622,495.

*To all whom it may concern:*

Be it known that I, CHARLES FOWLER, a citizen of the United States, a resident of New York, in the county of New York and State of New York, have invented certain new and useful Improvements in Tunnel Transportation Systems, of which the following is a specification.

This invention relates to a tunnel transportation system and more particularly to a system in which electric trains are employed to transport vehicles of various kinds.

In the construction of tunnels for the purpose of providing means for vehicular traffic of all kinds it has been proposed to allow the vehicles to pass through the tunnel under their own power and to provide means for ventilating the tunnel and exhausting foul and impure air therefrom, by suitable air conduits and blowers. Such a system is open to several objections. In the first place should anything happen to the air ventilation means there would be great danger of suffocation to those driving vehicles through the tunnel as the exhaust gases from automobiles would soon fill the tunnel with suffocating gases. In the second place vehicles traveling through the tunnel would have to follow each other in a continuous line so that if any vehicle broke down the procession would be obliged to stop long enough to allow the vehicle to be moved to one side or otherwise disposed of. The time required for such a procession of vehicles to traverse the tunnel would be quite long since the speed would depend upon the speed of the slowest vehicle in any given procession of vehicles, where more than one is contemplated.

It is an object of my invention to overcome these defects and objections and provide means for rapidly and securely transporting vehicles of all descriptions through a tunnel in a safe and rapid manner without the necessity of ventilating the tunnel by a very costly system.

Accordingly I have devised an electric transportation system comprising electric trains or cars having platforms provided thereon for conveying vehicles and by virtue of this arrangement the vehicles will not travel under their own power and would not emit obnoxious vapors. I have, furthermore, provided turn-tables on the cars operated by individual electric motors from the front of the train so that the vehicles may be simultaneously loaded onto the trains or cars and simultaneously removed therefrom without loss of time.

In the preferred embodiment of my invention which is illustrated in the accompanying drawings, I have shown a portion of a train of cars with turn-tables on each car, each turn-table to contain a vehicle. In said drawings—

Figure 1 represents a plan view of a portion of a car provided with three turn-tables, one of which is shown for the purpose of illustration turned at an angle to the car for the purpose of loading or unloading a vehicle. It will be understood that the turn-tables will not ordinarily be in different positions.

Figure 2 represents a sectional elevation of an end of a car showing the means for operating a turn-table.

Figure 3 is a sectional end view of a car and turn-table showing the means for blocking the wheels of a vehicle, and Figure 4 is a diagram of the electrical circuits employed for operating the individual motors of the turn-tables or the individual motors for the worm devices for the wheel blocking means.

In said preferred embodiment there is shown a portion of a car 1 which may form one of a train of cars and this car is provided with a number of turn-tables 2, 3, 4, etc. each turn-table being adapted to receive a vehicle. The turn-tables are mounted for rotation on heavy pivot pins such as 5 and are supported by rollers 6. They are normally positioned in line with the cars and are held in such position by wheel blocking means 7 which also serve to hold wheels of vehicles in position against longitudinal movement. These blocking means 7 which in this case take the form of suitably shaped heavy bars or blocks of wood, are attached to arms 8 which are pivoted at their other ends to internally threaded collars 9 receiving the worm 10. The worm is threaded on opposite sides with right and left threads so as to move the collars in opposite directions when the worm is rotated. The worm is rotated by a suitable gear 11 in the central portion thereof and this gear 11 is driven by a gear 12 upon a shaft 13 which is driven from a motor 14 through a friction clutch 15. The motor 14 is operated by means to be subsequently described. It will be apparent that as the worm is rotated the collars 9 will approach each other and cause the bars 7 to be moved toward the worm and out of engagement with the side walls of the turn-table thus permitting the turn-table to rotate through an angle. When the worm is thereafter rotated in the opposite direction the bars will each move into the turn-tables until the links 8 are fully extended, or until they contact with the wheels of a vehicle, whereupon further motion will cease, which action is made possible by the friction clutch connection, the motors being automatically operated to stop when the links are fully extended. Means such as a projection A may also be provided on the collar 9 engaging a contact button B on the adjacent bearings to shut off the motor when the bar 7 is extended its full length, and means such as an upstanding stud C for engagement with the projection A may also be provided for shutting off the motor when the collars arrive at the limit of inward movement. Means may also be provided on the bars 7 in the form of contact buttons or a contact bar D to shut off the motor when the bar 7 contacts with the wheels of the vehicle.

The means for rotating a turn-table comprise a circular rack 16 underneath the floor of the turn-table and a pinion 17 engaging the rack, said pinion being operated by a gear 18, the gear driven by a motor 19. This motor is operated from the front of the car or preferably from the front of a train of cars by the electrical mechanism illustrated in Figure 4. The various turn-table motors of which there may be any desired number, are designated 19, and these motors may be driven in forward and reverse directions according as it is desired to rotate the turn-tables in one direction or the other. The main feeders are represented by 20 and 21, these feeders serving also to supply current for the motors for driving the cars. A reversing switch is shown having the usual six contacts designated 22, 23, 24, 25, 26, 27, contacts 22 and 27 being connected and contacts 24 and 25 being connected as shown. Sliding contact bars 28 and 29 of a switch are mounted to connect opposite sets of poles, this switch being operated by an electro-magnet 30 which is energized by coils 31 and 32 in circuit with batteries 33 and 34. The switches 35 and 36 are positioned in the front of the train or the car so as to be under control of the engineer or motorman. It will be apparent that when the switch 35 is closed and the reversing switch moves to the left current will pass from the feeder 21 through the connection 37 to the contacts 24 and 25, thence to the contact 26 along the circuit 38 and through the field coils 39 and thence through the contacts 23 and 27 to the motors and the feeder 20. When the switch 36 is closed current will pass through the contacts 24 and 25 and thence through the field 39 in the opposite direction, thus reversing the motors. It will be evident that the circuit always passes through the motors 19 in the same direction while the current in the field is reversed according as the switch 35 and 36 is closed.

The same electrical layout may be used for operating the individual motors connected to the rotating worms so as to have an independent operation of each worm.

In the operation of the system a train of cars may be made up, similar to the present day subway train, with a motorman at the front of the train operating the train in the usual manner and also the switches for operating the individual motors for the turn-tables and for the rotating worms. When the train is ready to start through the tunnel all of the turn-tables will be rotated to the position shown by turn-table 4 in Figure 1, and the vehicles will all be loaded on from the same side of the train. Thereupon the turn-tables will be rotated into line with the train and the worms will then be rotated to advance the block 7 so as to hold the wheels of the vehicles. Since some vehicles will be longer than others the block 7 will contact with the wheels before they are fully extended. In this position the turn-tables will be unable to rotate and the train will go forward through the tunnel. At the opposite end of the tunnel the turn-tables will be rotated in the other direction and the vehicles will simultaneously be unloaded while a new load will be taken on from the opposite side of the train. The turn-tables may be rotated through an angle for the purpose of taking on the new load of vehicles or they may remain in the same position. It will thus be seen that very little time is lost for unloading and re-loading the train since all of the vehicles are unloaded simultaneously. The transit through the tunnel will also be very speedy and a number of trains may be used, thereby considerably increasing the volume of traffic. No obnoxious gases will fill the tunnel and the time of travel thereupon will be considerably reduced as against a system under which vehicles pass through under their own power.

As many apparently widely different embodiments of my invention may be made without departing from the spirit thereof, it is to be understood that I do not limit myself to the described embodiment, except as indicated in the following claims.

I claim:

1. In a tunnel transportation system, an electrically driven car having a plurality of turn-tables thereon for receiving vehicles.

2. In a tunnel transportation system, an electrically driven car having a turn-table thereon for receiving vehicles, said turn-table being rotated by electrically driven mechanism, a controller for the car and a controller for the turn-table adjacent the car controller.

3. In a tunnel transportation system, an electrically driven car, turn-tables on the car for receiving vehicles, a motor for rotating each turn-table, an electrical means at the front of the car for rotating the turn-tables through an angle and reversing the rotation.

4. In a tunnel transportation system, an electrically driven car having turn-tables thereon for receiving vehicles and means at the end of the turn-tables for holding the wheels of vehicles against movement, said means being mounted to be withdrawn when the turn-tables are rotated.

5. In a tunnel transportation system, an electrically driven car having turn-tables thereon for vehicles, means at the end of the turn-tables for holding the wheels of vehicles, said means being advanced into and withdrawn from the turn-tables by electrically operated mechanism.

6. In a tunnel transportation system, an electrically driven car having turn-tables thereon for vehicles, means at the end of the turn-tables for holding the wheels of vehicles, said means being advanced into and withdrawn from the turn-tables by electrically operated mechanism comprising a right and left threaded worm driven by a motor.

7. In a tunnel transportation system, an electrically driven car having turn-tables thereon for vehicles, means at the end of the turn-tables for holding the wheels of vehicles, said means being advanced into and withdrawn from the turn-tables by electrically operated mechanism, comprising a right and left threaded worm driven by a motor and threaded collars on the worm connected by links to a movable bar.

8. In a tunnel transportation system, a train of cars electrically driven and turn-tables on the cars for receiving vehicles, each turn-table being rotatable through an angle by electrical mechanism operated from the front of the train.

9. In a tunnel transportation system, a train of cars electrically driven, turn-tables on the cars for receiving vehicles, individual motors for each turn-table said turn-tables being operated from the front of the train by a reversing switch.

10. In a tunnel transportation system, an electrically driven car, a plurality of turn-tables on the car for receiving vehicles, an electric motor for operating each turn-table, and electrical means at the front of the car for controlling the motors to simultaneously rotate the turn-tables through an angle.

11. In a tunnel transportation system, a train of cars electrically driven, and turn-tables on the cars for receiving vehicles, all of the turn-tables being simultaneously rotatable through an angle by electrical mechanism operated from the front of the train.

In testimony that I claim the foregoing, I have hereunto set my hand this 21st day of February, 1923.

CHARLES FOWLER.